(No Model.)
H. G. CADY.
NUT LOCK.
No. 301,208. Patented July 1, 1884.
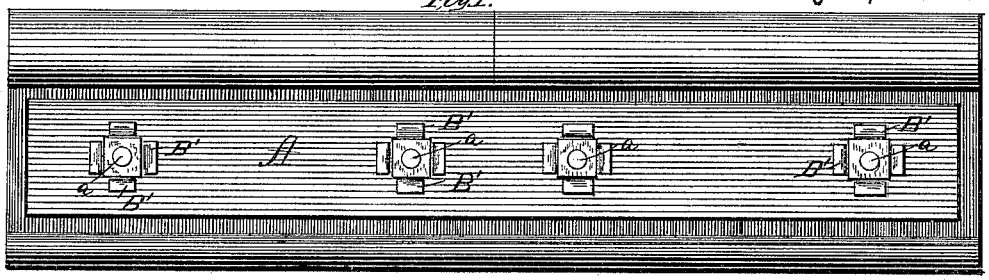
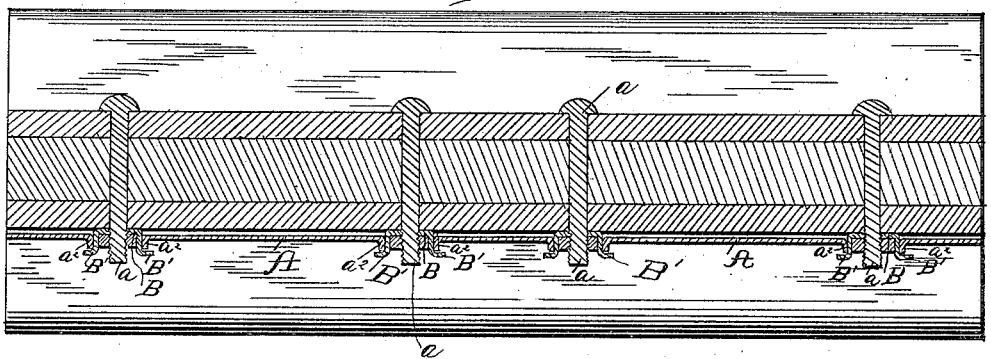
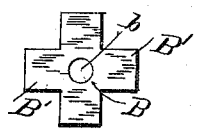
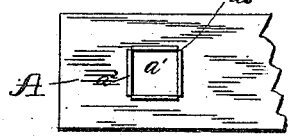
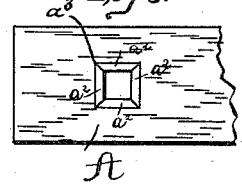
WITNESSES
INVENTOR
Henry G. Cady

UNITED STATES PATENT OFFICE.

HENRY G. CADY, OF PINE BLUFF, ARKANSAS.

NUT-LOCK.

SPECIFICATION forming part of Letters Patent No. 301,208, dated July 1, 1884.

Application filed March 29, 1884. (No model.)

*To all whom it may concern:*

Be it known that I, HENRY G. CADY, a citizen of the United States of America, residing at Pine Bluff, in the county of Jefferson and State of Arkansas, have invented certain new and useful Improvements in Nut-Locks, of which the following is a specification, reference being had therein to the accompanying drawings.

This invention pertains to an improvement in nut-locks, having for its object to prevent the jarring loose of nuts, and the accidental unscrewing of the same off their bolts; and it consists of the detailed construction of the appliance to effect the aforesaid purpose, substantially as hereinafter fully set forth, and pointed out in the claim.

In the accompanying drawings, Figure 1 is a side view of my improvement. Fig. 2 is a longitudinal horizontal section thereof. Figs. 3, 4, and 5 are detail views of the same.

In the organization of my invention the winged metal washers B, Fig. 3, having the aperture $b$, are first slipped upon the bolts, and rest against the fish-plate, (if it be a railway-rail to which it is applied,) and then the nuts are screwed tightly upon their bolts, after which the wings of said washers B are bent upwardly against the sides of the nuts, said wings being permitted to remain thus bent for the time being. The apertures $a'$ of plate A receive the nuts and wings B', and are stamped in plates, and primarily made of less size than the nuts, and the metal at each of the corners of said apertures is slitted, as at $a^3$, a short distance, to permit, by forcing the plate A upon the nuts, the upward yielding of the metal $a^2$ at the edges of the apertures around and so as to embrace the sides of the nuts, whereby the nuts may be locked and plate A wedged upon the nuts, the bolts being rigidly secured in position by the tightened nuts. The upper portions of the wings B' are now bent down upon the upper edges of the upwardly-bent portions of the apertures of plate A, when the nuts and plate A will be firmly locked together.

Having thus fully described my invention, what I claim, and desire to secure by Letters Patent, is—

The combination, with the bolts and their nuts, of the winged washers, with their wings upwardly bent against the nuts, and the plate having the edges of its apertures upwardly bent against the said wings, the upper portion of said wings being bent down upon the upper edges of said upwardly-bent portions of the metal at the plate-apertures, substantially as and for the purpose set forth.

In testimony whereof I affix my signature in presence of two witnesses.

HENRY G. CADY.

Witnesses:
C. F. GREY,
O. H. TEHENIG.